United States Patent
Dotson et al.

(10) Patent No.: US 11,746,212 B2
(45) Date of Patent: *Sep. 5, 2023

(54) ADDITIVE COMPOSITION AND METHOD FOR PRODUCING A POLYMER COMPOSITION USING THE SAME

(71) Applicant: Milliken & Company, Spartanburg, SC (US)

(72) Inventors: Darin L. Dotson, Moore, SC (US); Xiaoyou Xu, Spartanburg, SC (US); Walter Forrister, Inman, SC (US); Chi-Chun Tsai, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 167 days.

This patent is subject to a terminal disclaimer.

(21) Appl. No.: 17/471,812

(22) Filed: Sep. 10, 2021

(65) Prior Publication Data

US 2022/0002519 A1 Jan. 6, 2022

Related U.S. Application Data

(63) Continuation of application No. 16/518,473, filed on Jul. 22, 2019, now Pat. No. 11,118,027.

(60) Provisional application No. 62/702,389, filed on Jul. 24, 2018.

(51) Int. Cl.
*C08K 5/098* (2006.01)
*C08J 3/20* (2006.01)
*C08K 5/00* (2006.01)

(52) U.S. Cl.
CPC ............... *C08K 5/098* (2013.01); *C08J 3/20* (2013.01); *C08K 5/0083* (2013.01); *C08J 2323/06* (2013.01); *C08J 2323/12* (2013.01)

(58) Field of Classification Search
CPC .............................. C08K 5/098; C08K 5/0083
See application file for complete search history.

(56) References Cited

U.S. PATENT DOCUMENTS

| | | |
|---|---|---|
| 3,207,735 A | 9/1965 | Wijga |
| 3,207,736 A | 9/1965 | Wijga |
| 3,207,737 A | 9/1965 | Wales |
| 3,207,738 A | 9/1965 | Wijga |
| 3,207,739 A | 9/1965 | Wales |
| 3,268,499 A | 8/1966 | Wales |
| 3,299,029 A | 1/1967 | Binsbergen et al. |
| 3,326,972 A | 1/1967 | Schenk et al. |
| 5,981,636 A | 11/1999 | Amos et al. |
| 6,599,971 B2 | 7/2003 | Dotson et al. |
| 2004/0132884 A1 | 7/2004 | Dotson |
| 2007/0036960 A1 | 2/2007 | Lambert |
| 2010/0010168 A1 | 1/2010 | Wolfschwenger |
| 2014/0179846 A1 | 6/2014 | Lake, Jr. |
| 2020/0131331 A1 | 4/2020 | Zhao |

FOREIGN PATENT DOCUMENTS

| | | |
|---|---|---|
| WO | WO 2002/077092 A1 | 10/2002 |
| WO | 2014099144 A1 | 6/2014 |
| WO | WO 2014/099144 A1 | 6/2014 |
| WO | 2014202603 A1 | 12/2014 |
| WO | WO 2014/202603 A1 | 12/2014 |
| WO | 2020068679 A1 | 4/2020 |

OTHER PUBLICATIONS

Zhang (Preparation and nucleation effects of nucleating agent hexahydrophthalic acid metal salts for isotactic polypropylene. Colloid Polym Sci, 295, 2017, pp. 1973-1982).
PCT/US2019/042820 International Search Report, Filed Jul. 22, 2019, 4 pages.
PCT/US2019/042820 Written Opinion of the International Searching Authority, Filed Jul. 22, 2019, 7 pages.
Beck, H.N., "Heterogenous Nucleating Agents for Polypropylene Crystalization", Journal of Applied Polymer Science, vol. 11, pp. 673-685 (1967).

*Primary Examiner* — Brieann R Johnston
(74) *Attorney, Agent, or Firm* — Robert M. Lanning

(57) ABSTRACT

An additive composition comprises an antioxidant and one or more calcium cis-1,2-cyclohexanedicarboxylate salts. 25 mol. % or more of the calcium cis-1,2-cyclohexanedicarboxylate salts present in the additive composition are calcium cis-1,2-cyclohexanedicarboxylate monohydrate. A method for producing a thermoplastic polymer composition entails mixing the additive composition with a thermoplastic polymer, melting the resulting admixture, and letting the admixture solidify to produce a polymer composition.

20 Claims, No Drawings

ADDITIVE COMPOSITION AND METHOD FOR PRODUCING A POLYMER COMPOSITION USING THE SAME

CROSS-REFERENCE TO RELATED APPLICATIONS

This application is a continuation of U.S. patent application Ser. No. 16/518,473 filed on Jul. 22, 2019, now issued as U.S. Pat. No. 11,118,027 on Sep. 14, 2021, which application claims, pursuant to 35 U.S.C. § 119(e), priority to and the benefit of the filing date of U.S. Patent Application No. 62/702,389 filed on Jul. 24, 2018. The contents of these prior applications are hereby incorporated by reference.

TECHNICAL FIELD OF THE INVENTION

This application relates to additive compositions suitable for use as crystalline nucleating agents for polymers, methods for producing polymer compositions using such additive compositions, and the polymer compositions made using such methods.

BACKGROUND

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer.

While polymer nucleating agents may function in a similar manner, not all nucleating agents are created equal. For example, a particular nucleating agent may be very effective at increasing the peak polymer recrystallization temperature of a thermoplastic polymer, but the rapid rate of crystallization induced by such a nucleating agent may cause inconsistent (anisotropic) shrinkage of a molded part produced from a thermoplastic polymer composition containing the nucleating agent. Such a nucleating agent may also be ineffective in increasing the stiffness of the molded part to a desirable degree.

Given the complicated interrelationship of these properties and the fact that many nucleating agents exhibit less-than-optimal behavior in at least one respect, a need remains for nucleating agents that are capable of producing thermoplastic polymer compositions exhibiting a more desirable combination of high peak polymer recrystallization temperature, low and isotropic shrinkage, and high stiffness. The additive compositions, polymer compositions, and methods of making the same described herein seek to fulfill this need.

BRIEF SUMMARY OF THE INVENTION

In a first embodiment, the invention provides an additive composition comprising one or more calcium cis-1,2-cyclohexanedicarboxylate salts, wherein 25 mol. % or more of the calcium cis-1,2-cyclohexanedicarboxylate salts present in the additive composition are calcium cis-1,2-cyclohexanedicarboxylate monohydrate. The additive composition preferably has a gravimetric water content of about 20% or less.

In a second embodiment, the invention provides a method for producing a polymer composition, the method comprising the steps of: (a) providing a thermoplastic polymer, the thermoplastic polymer having a melting point; (b) providing an additive composition as described above; (c) combining the thermoplastic polymer and the additive composition to produce an admixture; (d) heating the admixture to a temperature above the melting point of the thermoplastic polymer to produce a molten admixture; and (e) reducing the temperature of the molten admixture to a temperature below the melting point of the thermoplastic polymer, thereby producing a polymer composition.

DETAILED DESCRIPTION OF THE INVENTION

In a first embodiment, the invention provides an additive composition comprising one or more calcium cis-1,2-cyclohexanedicarboxylate salts. Preferably, the additive composition comprises calcium cis-1,2-cyclohexanedicarboxylate monohydrate (i.e., $CaC_8H_{10}O_4 \cdot 1H_2O$) and one or more additional calcium cis-1,2-cyclohexanedicarboxylate salts, such as anhydrous calcium cis-1,2-cyclohexanedicarboxylate (i.e., $CaC_8H_{10}O_4$).

The calcium cis-1,2-cyclohexanedicarboxylate monohydrate can be present in the additive composition in any suitable amount. In one embodiment, the amount of calcium cis-1,2-cyclohexanedicarboxylate monohydrate can be expressed as a percentage of the total amount of calcium cis-1,2-cyclohexanedicarboxylate salts that are present in the additive composition. In such an embodiment, 25 mol. % or more of the calcium cis-1,2-cyclohexanedicarboxylate salts present in the additive composition preferably are calcium cis-1,2-cyclohexanedicarboxylate monohydrate. More preferably, about 33 mol. % or more, about 50 mol. % or more, about 75 mol. % or more, about 90 mol. % or more, or about 95 mol. % or more of the calcium cis-1,2-cyclohexanedicarboxylate salts present in the additive composition are calcium cis-1,2-cyclohexanedicarboxylate monohydrate.

While the additive composition contains a hydrated calcium cis-1,2-cyclohexanedicarboxylate salt, the additive composition preferably contains a limited amount of water. Preferably, the additive composition has a gravimetric water content of about 20% or less. More preferably, the additive composition has a gravimetric water content of about 15% or less or about 10% or less. Since the additive composition contains some calcium cis-1,2-cyclohexanedicarboxylate monohydrate, the gravimetric water content of the additive composition will be greater than zero. Accordingly, in a preferred embodiment, the additive composition has a gravimetric water content of about 2% or more. In other preferred embodiments, the additive composition has a gravimetric water content of about 3% or more, about 4% or more, about 5% or more, about 6% or more, or about 7% or more. Thus, in a series of preferred embodiments, the additive composition preferably has a gravimetric water content of 2% to about 20% (e.g., about 2% to about 15% or about 2% to about 10%), about 3% to about 20% (e.g., about 3% to about 15% or about 3% to about 10%), about 4% to about 20% (e.g., about 4% to about 15% or about 4% to about 10%), about 5% to about 20% (e.g., about 5% to about 15% or about 5% to about 10%), about 6% to about 20% (e.g., about 6% to about 15% or about 6% to about 10%), or about 7% to about 20% (e.g., about 7% to about 15% or about 7% to about 10%).

The additive composition can comprise further components in addition to the calcium cis-1,2-cyclohexanedicarboxylate salts described above. Suitable additional components include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., hydrotalcite-like acid scavengers [e.g., DHT-4A® from Kisuma Chemicals], metal salts of fatty acids [e.g., the metal salts of stearic acid], and metals salts of fatty acid esters [e.g., lactylate salts]), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

In a preferred embodiment, the additive composition further comprises a metal salt of a fatty acid. Suitable metal salts of fatty acids include, but are not limited to, salts of saturated and unsaturated (i.e., monounsaturated and polyunsaturated) fatty acids (e.g., $C_6$ or greater fatty acids) and esters of such saturated and unsaturated fatty acids (e.g., lactic acid or poly(lactic acid) esters). In a preferred embodiment, the fatty acid is selected from the group consisting of saturated and unsaturated $C_8$-$C_{28}$ fatty acids, more preferably saturated and unsaturated $C_{12}$-$C_{22}$ fatty acids. More preferably, the fatty acid is selected from the group consisting of saturated $C_8$-$C_{28}$ fatty acids, even more preferably saturated $C_{12}$-$C_{22}$ fatty acids. In a more specific preferred embodiment, the additive composition comprises at least one metal salt of a fatty acid selected from the group consisting of laurate salts, myristate salts, palmitate salts, stearate salts (e.g., stearate salts and 12-hydroxystearate salts), arachidate (eicosanoate) salts, behenate salts, lactylate salts, and mixtures thereof. In a preferred embodiment, the additive composition comprises at least one metal salt of a fatty acid selected from the group consisting of myristate salts, palmitate salts, stearate salts, and mixtures thereof. In another preferred embodiment, the additive composition comprises at least one metal salt of a fatty acid selected from the group consisting of myristate salts, stearate salts, and mixtures thereof. More preferably, the additive composition comprises a metal salt of stearic acid. The metal salts of fatty acids described above typically are derived from natural sources and, therefore, contain a mixture of fatty acid salts having different carbon chain lengths. For example, a product sold as a stearate salt can contain appreciable amounts of palmitate salts and/or arachidate salts. Further, the distribution of different fatty acid salts within the product can vary depending upon the particular source used to produce the product. Thus, as used in this application, a reference to a metal salt of a particular fatty acid salt is not intended to solely encompass the pure fatty acid salt. Rather, a reference to a particular fatty acid salt also encompasses products commercially sold as that particular fatty acid salt, even if such products also contain measurable amounts of fatty acid salts having similar carbon chain lengths.

The salt of the fatty acid can comprise any suitable counterion to balance the charge of the fatty acid anion. As noted above, the counterion preferably is a metal cation. In a preferred embodiment, the metal salt of a fatty acid comprises a cation selected from the group consisting of alkali metal cations, alkaline earth metal cations, and group 12 element cations. More preferably, the metal salt of a fatty acid comprises a cation selected from the group consisting of group 12 element cations. Most preferably, the metal salt of a fatty acid comprises a zinc cation (i.e., a zinc (II) cation).

The salt of a fatty acid can be present in the additive composition in any suitable amount. In a preferred embodiment, the salt of a fatty acid is present in the additive composition in an amount of about 1 part or more per 19 parts (by weight) of calcium cis-1,2-cyclohexanedicarboxylate salts present in the additive composition. In another preferred embodiment, the salt of a fatty acid is present in the additive composition in an amount of about 1 part or more per 9 parts, about 1 part or more per 4 parts, about 1 part or more per 3 parts, about 3 parts or more per 7 parts, or about 1 part or more per 2 parts (by weight) of calcium cis-1,2-cyclohexanedicarboxylate salts present in the additive composition. The salt of a fatty acid preferably is present in the additive composition in an amount of about 9 parts or less per 1 part, about 4 parts or less per 1 part, about 3 parts or less per 1 part, about 7 parts or less per 3 parts, about 3 parts or less per 2 parts, about 1 part or less per 1 part, or about 2 parts or less per 3 parts (by weight) of calcium cis-1,2-cyclohexanedicarboxylate salts present in the additive composition. Thus, in a series of preferred embodiments, the salt of a fatty acid and calcium cis-1,2-cyclohexanedicarboxylate salts are present in the additive composition in ratios of about 1:19 to about 9:1, about 1:9 to about 4:1, about 1:4 to about 3:1, about 3:7 to about 7:3, about 1:2 to about 3:2, about 1:2 to about 1:1, or about 1:2 to about 2:3 (the ratios being expressed as parts by weight of fatty acid salt to parts by weight of calcium cis-1,2-cyclohexanedicarboxylate salts). Preferably, the salt of a fatty acid is present in the additive composition in an amount of about 1 part per 2 parts of calcium cis-1,2-cyclohexanedicarboxylate salts present in the additive composition.

As noted above, the additive composition is believed to especially well-suited for use as a nucleating agent for thermoplastic polymers, especially polyolefins such as polypropylene. Polymer compositions made with the additive composition described above have been observed to exhibit a combination of desirable physical properties. For example, polymer compositions (e.g., polypropylene polymer compositions) made with an additive composition according to the invention can exhibit peak polymer recrystallization temperatures in excess of 124° C., which is high enough to significantly shorten cycle times in some molding operations. These polymer compositions also exhibit relatively high stiffness relative to polymer compositions nucleated with additive compositions that do not contain appreciable amounts of calcium cis-1,2-cyclohexanedicarboxylate monohydrate. Additionally, polymer compositions (e.g., polypropylene polymer compositions) made with an additive composition according to the invention exhibit lower machine and traverse direction shrinkage than similar polymer compositions nucleated with additive compositions that do not contain appreciable amounts of calcium cis-1,2-cyclohexanedicarboxylate monohydrate. Further, the polymer compositions made with an additive composition according to the invention exhibit more isotropic shrinkage, which means that a part made from the polymer composition is more dimensionally stable and less likely to warp as it is exposed to changing temperatures. It is generally believed that lower shrinkage is a desirable feature, as shrinkage of the polymer composition is directly related to thermal expansion of the polymer composition on heating. Thermal expansion of the polymer composition is a particular concern in applications where the polymer composition will be subject to large swings in temperature, such as automotive trim applications (e.g., automobile bumpers). In such applications, thermal expansion of the part must be tightly controlled to prevent the part from warping, deforming, or impinging on adjacent metalwork in high heat.

Thus, in a second embodiment, the invention provides a method for producing a polymer composition. The method comprises the steps of: (a) providing a thermoplastic polymer, the thermoplastic polymer having a melting point; (b) providing an additive composition as described above; (c) combining the thermoplastic polymer and the additive composition to produce an admixture; (d) heating the admixture to a temperature above the melting point of the thermoplastic polymer to produce a molten admixture; and (e) reducing the temperature of the molten admixture to a temperature below the melting point of the thermoplastic polymer, thereby producing a polymer composition.

The method of the invention can utilize any suitable thermoplastic polymer. Preferably, the thermoplastic polymer is a polyolefin. The polyolefin polymer can be any suitable polyolefin, such as a polypropylene, a polyethylene, a polybutylene, a poly(4-methyl-1-pentene), and a poly(vinyl cyclohexane). In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylenediene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. The polyolefin polymers described above can be branched or cross-linked, such as the branching or cross-linking that results from the addition of additives that increase the melt strength of the polymer.

In an alternative embodiment of the method, the thermoplastic polymer can be replaced with or used in combination with a suitable wax. In such an embodiment, the method of the invention can be used to produce a wax-containing additive composition or masterbatch that acts as a carrier for the calcium cis-1,2-cyclohexanedicarboxylate salts and is intended for further addition to a polymer. Suitable waxes include, but are not limited to, those selected from the group consisting of animal waxes, plant waxes, paraffin waxes, microcrystalline waxes, polyolefin waxes, Fischer-Tropsch waxes, and mixtures thereof. The choice of a suitable wax for the composition can be influenced by the properties of the polymer and/or polymer composition to which the composition will be added. For example, the wax preferably has a melting point that is less than or equal to the melting point of the target polymer or the polymer to be nucleated in the target polymer composition. This will ensure that the wax melts during processing to produce a molten liquid that can be thoroughly and evenly mixed with the target polymer, which in turn thoroughly and evenly disperses the nucleating agent in the polymer. Thus, the choice of a suitable wax for the composition can depend, at least in part, on the particular polymer being nucleated and the melting point of this polymer. Furthermore, the choice of a suitable wax may also depend upon the application(s) for which the polymer is intended. For example, if the polymer is intended for use in food contact applications, the wax preferably is one that has been recognized as safe for use in such food contact applications.

The additive composition can be combined with the thermoplastic polymer in any suitable amount. Preferably, the additive composition is present in the admixture in an amount of about 50 ppm or more, based on the total weight of the admixture. More preferably, the additive composition is present in the admixture in an amount of about 100 ppm or more, about 200 ppm or more, about 250 ppm or more, about 300 ppm or more, about 400 ppm or more, or about 500 ppm or more, based on the total weight of the admixture. In another preferred embodiment, the additive composition is present in the admixture in an amount of about 10,000 ppm or less, based on the total weight of the admixture. More preferably, the additive composition is present in the admixture in an amount of about 9,000 ppm or less, about 8,000 ppm or less, about 7,000 ppm or less, about 6,000 ppm or less, about 5,000 ppm or less, about 4,000 ppm or less, about 3,000 ppm or less, or about 2,500 ppm or less, based on the total weight of the admixture. Thus, in a series of preferred embodiments, the additive composition is present in the admixture in an amount of about 50 ppm to about 10,000 ppm (e.g., about 100 ppm to about 10,000 ppm), about 50 ppm to about 5,000 ppm, about 100 ppm to about 5,000 ppm, about 200 ppm to about 4,000 ppm, or about 250 ppm to about 3,000 ppm, based on the total weight of the admixture.

In another embodiment, the polymer composition produced by the method can be a masterbatch composition, which comprises a relatively high amount of the additive composition and is intended for let down into additional polymer to produce a finished polymer composition containing the desired, final loading level of additive composition. In such an embodiment, the additive composition can be present in the admixture in any suitable amount. In one embodiment, the additive composition preferably is present in the admixture in an amount of about 1 wt. % or more, based on the total weight of the admixture. More preferably, the additive composition is present in the admixture in an amount of about 2 wt. % or more, about 3 wt. % or more, about 4 wt. % or more, or about 5 wt. % or more, based on the total weight of the admixture. In such an embodiment of making a masterbatch composition, the additive composition preferably is present in the admixture in an amount of about 50 wt. % or less, about 40 wt. % or less, about 30 wt. % or less, about 20 wt. % or less, about 15 wt. % or less, or about 10 wt. % or less, based on the total weight of the admixture. Thus, in a series of preferred embodiments of producing a masterbatch composition, the additive composition is present in the admixture in an amount of about 1 wt. % to about 50 wt. % (e.g., about 1 wt. % to about 40 wt. %, about 1 wt. % to about 30 wt. %, about 1 wt. % to about 20 wt. %, about 1 wt. % to about 15 wt. %, or about 1 wt. % to about 10 wt. %), about 2 wt. % to about 50 wt. % (e.g., about 2 wt. % to about 40 wt. %, about 2 wt. % to about 30 wt. %, about 2 wt. % to about 20 wt. %, about 2 wt. % to about 15 wt. %, or about 2 wt. % to about 10 wt. %), about 3 wt. % to about 50 wt. % (e.g., about 3 wt. % to about 40 wt. %, about 3 wt. % to about 30 wt. %, about 3 wt. % to about 20 wt. %, about 3 wt. % to about 15 wt. %, or about 3 wt. % to about 10 wt. %), about 4 wt. % to about 50 wt. % (e.g., about 4 wt. % to about 40 wt. %, about 4 wt. % to about 30 wt. %, about 4 wt. % to about 20 wt. %, about 4 wt. % to about 15 wt. %, or about 4 wt. % to about 10 wt. %), or about 5 wt. % to about 50 wt. % (e.g., about 5 wt. % to about 40 wt. %, about 5 wt. % to about 30 wt. %, about 5 wt. % to about 20 wt. %, about 5 wt. % to about 15 wt. %, or about 5 wt. % to about 10 wt. %), based on the total weight of the admixture.

It is believed that most of the nucleating effect of the additive composition is dependent upon the concentration of the calcium cis-1,2-cyclohexanedicarboxylate salts present in the admixture. Thus, the amount of additive composition combined with the thermoplastic polymer can alternatively be expressed by stating the concentration of calcium cis-1, 2-cyclohexanedicarboxylate salts in the admixture. Preferably, the calcium cis-1,2-cyclohexanedicarboxylate salts are present in the admixture in an amount of about 50 ppm or more, based on the total weight of the admixture. More preferably, the calcium cis-1,2-cyclohexanedicarboxylate salts are present in the admixture in an amount of about 100 ppm or more, about 200 ppm or more, about 250 ppm or more, about 300 ppm or more, about 400 ppm or more, or about 500 ppm or more, based on the total weight of the admixture. In another preferred embodiment, the calcium cis-1,2-cyclohexanedicarboxylate salts are present in the admixture in an amount of about 10,000 ppm or less, based on the total weight of the admixture. More preferably, the calcium cis-1,2-cyclohexanedicarboxylate salts are present in the admixture in an amount of about 9,000 ppm or less, about 8,000 ppm or less, about 7,000 ppm or less, about 6,000 ppm or less, about 5,000 ppm or less, about 4,000 ppm or less, about 3,000 ppm or less, or about 2,500 ppm or less, based on the total weight of the admixture. Thus, in a series of preferred embodiments, the calcium cis-1,2-cyclohexanedicarboxylate salts are present in the admixture in an amount of about 50 ppm to about 10,000 ppm (e.g., about 100 ppm to about 10,000 ppm), about 50 ppm to about 5,000 ppm, about 100 ppm to about 5,000 ppm (e.g., about 100 ppm to about 4,000 ppm, about 100 ppm to about 3,000 ppm, about 100 to about 2,500 ppm, or about 100 ppm to about 2,000 ppm), about 200 ppm to about 4,000 ppm (e.g., about 200 ppm to about 3,000 ppm), or about 250 ppm to about 3,000 ppm, based on the total weight of the admixture.

Masterbatch compositions produced by the method can contain any suitable amount of the calcium cis-1,2-cyclohexanedicarboxylate salts. In one embodiment, the calcium cis-1,2-cyclohexanedicarboxylate salts preferably are present in the admixture in an amount of about 0.5 wt. % or more, based on the total weight of the admixture. More preferably, the additive composition is present in the admixture in an amount of about 1 wt. % or more, about 1.5 wt. % or more, about 2 wt. % or more, about 2.5 wt. % or more, about 3 wt. % or more, about 4 wt. % or more, or about 5 wt. % or more, based on the total weight of the admixture. In such an embodiment of making a masterbatch composition, the calcium cis-1,2-cyclohexanedicarboxylate salts preferably are present in an amount of about 50 wt. % or less, about 40 wt. % or less, about 30 wt. % or less, about 20 wt. % or less, about 15 wt. % or less, about 10 wt. % or less, about 7.5 wt. % or less, or about 5 wt. % or less, based on the total weight of the admixture. Thus, in a series of preferred embodiments of producing a masterbatch composition, the calcium cis-1,2-cyclohexanedicarboxylate salts are present in the admixture in an amount of about 0.5 wt. % to about 50 wt. % (e.g., about 0.5 wt. % to about 40 wt. %, about 0.5 wt. % to about 30 wt. %, about 0.5 wt. % to about 20 wt. %, about 0.5 wt. % to about 15 wt. %, about 0.5 wt. % to about 10 wt. %, about 0.5 wt. % to about 7.5 wt. %, or about 0.5 wt. % to about 5 wt. %), about 1 wt. % to about 50 wt. % (e.g., about 1 wt. % to about 40 wt. %, about 1 wt. % to about 30 wt. %, about 1 wt. % to about 20 wt. %, about 1 wt. % to about 15 wt. %, about 1 wt. % to about 10 wt. %, about 1 wt. % to about 7.5 wt. %, or about 1 wt. % to about 5 wt. %), about 1.5 wt. % to about 50 wt. % (e.g., about 1.5 wt. % to about 40 wt. %, about 1.5 wt. % to about 30 wt. %, about 1.5 wt. % to about 20 wt. %, about 1.5 wt. % to about 15 wt. %, about 1.5 wt. % to about 10 wt. %, about 1.5 wt. % to about 7.5 wt. %, or about 1.5 wt. % to about 5 wt. %), about 2 wt. % to about 50 wt. % (e.g., about 2 wt. % to about 40 wt. %, about 2 wt. % to about 30 wt. %, about 2 wt. % to about 20 wt. %, about 2 wt. % to about 15 wt. %, about 2 wt. % to about 10 wt. %, about 2 wt. % to about 7.5 wt. %, or about 2 wt. % to about 5 wt. %), about 2.5 wt. % to about 50 wt. % (e.g., about 2.5 wt. % to about 40 wt. %, about 2.5 wt. % to about 30 wt. %, about 2.5 wt. % to about 20 wt. %, about 2.5 wt. % to about 15 wt. %, about 2.5 wt. % to about 10 wt. %, about 2.5 wt. % to about 7.5 wt. %, or about 2.5 wt. % to about 5 wt. %), about 3 wt. % to about 50 wt. % (e.g., about 3 wt. % to about 40 wt. %, about 3 wt. % to about 30 wt. %, about 3 wt. % to about 20 wt. %, about 3 wt. % to about 15 wt. %, about 3 wt. % to about 10 wt. %, about 3 wt. % to about 7.5 wt. %, or about 3 wt. % to about 5 wt. %), about 4 wt. % to about 50 wt. % (e.g., about 4 wt. % to about 40 wt. %, about 4 wt. % to about 30 wt. %, about 4 wt. % to about 20 wt. %, about 4 wt. % to about 15 wt. %, about 4 wt. % to about 10 wt. %, about 4 wt. % to about 7.5 wt. %, or about 4 wt. % to about 5 wt. %), or about 5 wt. % to about 50 wt. % (e.g., about 5 wt. % to about 40 wt. %, about 5 wt. % to about 30 wt. %, about 5 wt. % to about 20 wt. %, about 5 wt. % to about 15 wt. %, about 5 wt. % to about 10 wt. %, about 5 wt. % to about 7.5 wt. %, or about 5 wt. % to about 5 wt. %), based on the total weight of the admixture.

The polymer composition produced by the method can comprise further components in addition to the additive composition described above. Suitable additional components include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., hydrotalcite-like acid scavengers [e.g., DHT-4A® from Kisuma Chemicals], metal salts of fatty acids [e.g., the metal salts of stearic acid], and metals salts of fatty acid esters [e.g., lactylate salts]), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

The polymer composition produced by the method described herein is believed to be useful in producing a variety of thermoplastic articles. The polymer composition can be formed into the desired thermoplastic article by any suitable technique, such as injection molding, injection rotational molding, blow molding (e.g., injection blow molding, injection stretch blow molding, extrusion blow molding, or compression blow molding), extrusion (e.g., sheet extrusion, film extrusion, cast film extrusion, or foam extrusion), thermoforming, rotomolding, film blowing (blown film), film casting (cast film), and the like.

The polymer composition produced by the method described herein can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

The following examples further illustrate the subject matter described above but, of course, should not be construed as in any way limiting the scope thereof.

Example 1

This example demonstrates the physical properties enhancements achieved using an additive composition according to the invention.

Polymer compositions were prepared by weighing the noted amount of additives into 3 kg batches of Pro-fax 6301 polypropylene homopolymer powder (LyondellBasell), high intensity mixing the combined ingredients, and extruding the resulting mixture into pellets on a single screw extruder. Each polymer composition contained 500 ppm of Irganox® 1010 (BASF), 1,000 ppm of Irgafos® 168 secondary antioxidant (BASF), and 400 ppm of calcium stearate as an acid scavenger. With the exception of the control polymer composition, each polymer composition also contained anhydrous calcium cis-1,2-cyclohexanedicarboxylate or calcium cis-1,2-cyclohexanedicarboxylate monohydrate in the amounts noted in Table 1 below. The resulting pellets were injection molded to produce test specimens for physical property testing. In particular, the polymer compositions were evaluated for peak polymer recrystallization temperature, % haze in accordance with ASTM Standard D1003 (50-mil plaques), flexural modulus in accordance with ASTM Standard D790, chord modulus in accordance with ISO Standard 178, and MD/TD shrinkage in accordance with ISO Standard 294.

TABLE 1

Anhydrous calcium cis-1,2-cyclohexanedicarboxylate (Anhydrous CaCCHD) and calcium cis-1,2-cyclohexanedicarboxylate monohydrate (CaCCHD hydrate) content of the control and Samples 1A-1H.

| Sample | Anhydrous CaCCHD (ppm) | CaCCHD monohydrate (ppm) |
|---|---|---|
| Control | — | — |
| 1A | 330 | — |
| 1B | 660 | — |
| 1C | — | 165 |

TABLE 1-continued

Anhydrous calcium cis-1,2-cyclohexanedicarboxylate (Anhydrous CaCCHD) and calcium cis-1,2-cyclohexanedicarboxylate monohydrate (CaCCHD hydrate) content of the control and Samples 1A-1H.

| Sample | Anhydrous CaCCHD (ppm) | CaCCHD monohydrate (ppm) |
|---|---|---|
| 1D | — | 330 |
| 1E | — | 495 |
| 1F | — | 660 |
| 1G | — | 990 |
| 1H | — | 1,320 |

TABLE 2

Peak polymer recrystallization temperature of Samples 1A, 1C, 1D, 1F, and 1G.

| Sample | Tc (° C.) |
|---|---|
| 1A | 123.5 |
| 1C | 124.67 |
| 1D | 124.33 |
| 1F | 125.67 |
| 1G | 126.5 |

As can be seen from the data in Table 2, Samples 1C, 1D, 1F, and 1G (all of which contain calcium cis-1,2-cyclohexanedicarboxylate monohydrate) exhibited higher peak polymer crystallization temperatures than Sample 1A (which contains anhydrous calcium cis-1,2-cyclohexanedicarboxylate). For example, Sample 1C exhibited a peak polymer recrystallization temperature that was over one degree Celcius higher than Sample 1A, which is remarkable when one considers the fact that Sample 1C contained only half of the amount (by weight) of calcium cis-1,2-cyclohexanedicarboxylate salts as Sample 1A. (Indeed, the molar amount of calcium cis-1,2-cyclohexanedicarboxylate monohydrate would be less than half because of the higher molecular weight of the calcium cis-1,2-cyclohexanedicarboxylate monohydrate.) These data show that calcium cis-1,2-cyclohexanedicarboxylate monohydrate is a more efficient nucleator than anhydrous calcium cis-1,2-cyclohexanedicarboxylate. Further, these differences in the polymer recrystallization temperature are significant to those working with plastics because the higher crystallization temperatures enable parts to be ejected from molds earlier, thereby decreasing cycle time and increasing process output.

TABLE 3

1% secant modulus (ASTM) and chord modulus (ISO) of the control and Samples 1A-1H.

| Sample | 1% Secant Modulus (MPa) | Chord Modulus (MPa) |
|---|---|---|
| Control | 1377.6 | 1330.3 |
| 1A | 1524.6 | 1506.2 |
| 1B | 1535.9 | 1525.7 |
| 1C | 1522.9 | 1505.9 |
| 1D | 1542.1 | 1533.3 |
| 1E | 1563.9 | 1544.8 |
| 1F | 1572.9 | 1555.6 |
| 1G | 1594.9 | 1572.9 |
| 1H | 1618.6 | 1586.4 |

As can be seen from the data in Table 3, Samples 1D-1H all exhibited appreciable increases in secant modulus and chord modulus over Samples 1A and 1B. For example, Sample 1D exhibited a secant modulus that was nearly 20

MPa higher and a chord modulus that has nearly 30 MPa higher than that exhibited by Sample 1A. Sample 1E exhibited a secant modulus that was nearly 30 MPa higher than that exhibited by Sample 1B. Further, Sample 1C exhibited a secant modulus and chord modulus that were nearly equal to that exhibited by Sample 1A. As noted above, this is significant given the lower amount of calcium cis-1,2-cyclohexanedicarboxylate salts present in Sample 1C as compared to Sample 1A. Again, Applicant believes these data show that calcium cis-1,2-cyclohexanedicarboxylate monohydrate is a more effective nucleator than anhydrous calcium cis-1,2-cyclohexanedicarboxylate.

TABLE 4

Machine direction (MD) shrinkage, transverse direction (TD) shrinkage, and isotropy of the control and Samples 1A-1H.

| Sample | MD Shrinkage (%) | TD Shrinkage (%) | Isotropy |
| --- | --- | --- | --- |
| Control | 1.27 | 1.28 | 0.99 |
| 1A | 1.21 | 1.2 | 1 |
| 1B | 1.2 | 1.18 | 1.01 |
| 1C | 1.15 | 1.2 | 0.96 |
| 1D | 1.14 | 1.18 | 0.97 |
| 1E | 1.12 | 1.16 | 0.97 |
| 1F | 1.14 | 1.15 | 0.99 |
| 1G | 1.12 | 1.13 | 0.99 |
| 1H | 1.12 | 1.12 | 1 |

As noted above in the detailed description, shrinkage of a polymer composition is an important factor to consider when producing parts from the polymer composition. Polymer compositions that exhibit significant amounts of shrinkage or uneven (anisotropic) shrinkage may yield undersirable warping or deformation when molded into parts. Even if such parts do not warp or deform immediately after molding, the residual stresses present in the parts from the shrinkage can deleteriously affect their performance when they are deployed for use. Further, as noted above, shrinkage also correlates to thermal expansion, with polymer compositions/parts exhibiting low shrinkage also exhibiting low thermal expansion.

As can be seen from the data set forth in Table 4, all of the polymer compositions made with calcium cis-1,2-cyclohexanedicarboxylate monohydrate (Samples 1C-1H) exhibited less machine direction shrinkage than the polymer compositions made with anhydrous calcium cis-1,2-cyclohexanedicarboxylate (Samples 1A and 1B). Further, with the exception of Sample 1C, all of the polymer compositions made with calcium cis-1,2-cyclohexanedicarboxylate monohydrate exhibited lower transverse direction shrinkage than the polymer compositions made with anhydrous calcium cis-1,2-cyclohexanedicarboxylate (Samples 1A and 1B). As noted above, the performance of Sample 1C is remarkable given the lower amount of calcium cis-1,2-cyclohexanedicarboxylate salts present in Sample 1C as compared to Sample 1A. Further, the improved shrinkage of Samples 1C-1H did not come at the expense of diminished isotropy. While the isotropy of Samples 1C-1G was lower than that of Samples 1A and 1B, the values are still close enough to unity to be considered practically isotropic. These data show that calcium cis-1,2-cyclohexanedicarboxylate monohydrate is an effective nucleating agent for delivering appreciable decreases in both machine direction and transverse direction shrinkage of the polymer (even relative to similar polymer compositions containing anhydrous calcium cis-1,2-cyclohexanedicarboxylate). These data also show that this decreased shrinkage remains essentially isotropic. Lastly, the reduced shrinkage exhibited by the polymer compositions made with calcium cis-1,2-cyclohexanedicarboxylate monohydrate should also exhibit appreciably less thermal expansion than the virgin resin or similar polymer compositions containing anhydrous calcium cis-1,2-cyclohexanedicarboxylate. Thus, the additive composition of the invention is believed to be especially well-suited for use in applications requiring parts that remain dimensionally stable with changing temperatures, such as automotive trim applications (e.g., bumpers).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An additive composition comprising:
   (a) an antioxidant; and
   (b) one or more calcium cis-1,2-cyclohexanedicarboxylate salts, wherein 25 mol. % or more of the calcium cis-1,2-cyclohexanedicarboxylate salts present in the additive composition are calcium cis-1,2-cyclohexanedicarboxylate monohydrate.

2. The additive composition of claim 1, wherein about 33 mol. % or more of the calcium cis-1,2-cyclohexanedicarboxylate salts present in the additive composition are calcium cis-1,2-cyclohexanedicarboxylate monohydrate.

3. The additive composition of claim 2, wherein about 50 mol. % or more of the calcium cis-1,2-cyclohexanedicarboxylate salts present in the additive composition are calcium cis-1,2-cyclohexanedicarboxylate monohydrate.

4. The additive composition of claim 3, wherein about 75 mol. % or more of the calcium cis-1,2-cyclohexanedicarboxylate salts present in the additive composition are calcium cis-1,2-cyclohexanedicarboxylate monohydrate.

5. The additive composition of claim 4, wherein about 90 mol. % or more of the calcium cis-1,2-cyclohexanedicarboxylate salts present in the additive composition are calcium cis-1,2-cyclohexanedicarboxylate monohydrate.

6. The additive composition of claim 1, wherein the additive composition further comprises a metal salt of a fatty acid.

7. The additive composition of claim 6, wherein the fatty acid is selected from the group consisting of $C_8$-$C_{28}$ fatty acids.

8. The additive composition of claim 7, wherein the fatty acid is selected from the group consisting of $C_{12}$-$C_{22}$ fatty acids.

9. The additive composition of claim 8, wherein the fatty acid is stearic acid.

10. The additive composition of claim 6, wherein the metal salt of a fatty acid comprises a cation selected from the group consisting of alkali metal cations, alkaline earth metal cations, and group 12 element cations.

11. The additive composition of claim 10, wherein the metal salt of a fatty acid comprises a group 12 element cation.

12. The additive composition of claim 11, wherein the metal salt of a fatty acid comprises a zinc cation.

13. The additive composition of claim 12, wherein the additive composition further comprises zinc stearate.

14. The additive composition of claim 1, wherein the antioxidant is selected from the group consisting of phenolic antioxidants, phosphite antioxidants, and mixtures thereof.

15. A method for producing a polymer composition, the method comprising the steps of:
(a) providing a thermoplastic polymer, the thermoplastic polymer having a melting point;
(b) providing the additive composition of claim 1;
(c) combining the thermoplastic polymer and the additive composition to produce an admixture;
(d) heating the admixture to a temperature above the melting point of the thermoplastic polymer to produce a molten admixture; and
(e) reducing the temperature of the molten admixture to a temperature below the melting point of the thermoplastic polymer, thereby producing a polymer composition.

16. The method of claim 15, wherein the thermoplastic polymer is a polyolefin.

17. The method of claim 16, wherein the polyolefin is a polypropylene.

18. The method of claim 16, wherein the polyolefin is a polyethylene.

19. The method of claim 15, wherein the admixture contains about 50 ppm to about 5,000 ppm of calcium cis-1,2-cyclohexanedicarboxylate salts.

20. The method of claim 19, wherein the admixture contains about 100 ppm to about 2,000 ppm of calcium cis-1,2-cyclohexanedicarboxylate salts.

* * * * *